United States Patent [19]

Kaneko

[11] 4,112,704
[45] Sep. 12, 1978

[54] PILOT VALVE-TYPE EVAPORATING PRESSURE-REGULATING VALVE USED IN REFRIGERATORS

[75] Inventor: Moriwo Kaneko, Sayama, Japan

[73] Assignee: Kabushiki Kaisha Saginomiya Seisakusho, Tokyo, Japan

[21] Appl. No.: 775,424

[22] Filed: Mar. 8, 1977

[30] Foreign Application Priority Data

Jul. 6, 1976 [JP] Japan .............................. 51-98615[U]

[51] Int. Cl.² .................. F25B 41/04; F16K 17/26
[52] U.S. Cl. ...................................... 62/217; 137/491
[58] Field of Search .............. 62/217; 137/489, 491, 137/489.3

[56] References Cited

U.S. PATENT DOCUMENTS

| | | | |
|---|---|---|---|
| 2,044,452 | 6/1936 | Terry | 137/489.3 X |
| 2,333,522 | 11/1943 | Clifton | 137/491 |
| 2,966,044 | 12/1960 | Mitchell | 62/217 |
| 3,064,447 | 11/1962 | Heidorn | 62/217 X |

*Primary Examiner*—William E. Wayner
*Attorney, Agent, or Firm*—Armstrong, Nikaido, Marmelstein & Kubovcik

[57] ABSTRACT

A pilot valve-type evaporating pressure-regulating valve used in refrigerators comprising a valve sleeve having an outer and an inner chamber, a piston valve member sliding in said inner chamber and having an equalizing hole connecting the interior of the piston and the inner chamber, a pilot valve having a pilot chamber provided in the end wall of the valve sleeve and covered with a diaphragm, a pilot passage formed in said end wall to connect said pilot chamber with said inner and outer chambers, and a ball valve member kept in connection with said diaphragm and normally closing and opening said pilot passage in response to the pressure in said inner chamber by movement of said diaphragm. The diaphragm is moved by the pressure-set force of a spring which is, however, variable and adjustable from the outside by rotation of a screw.

3 Claims, 1 Drawing Figure

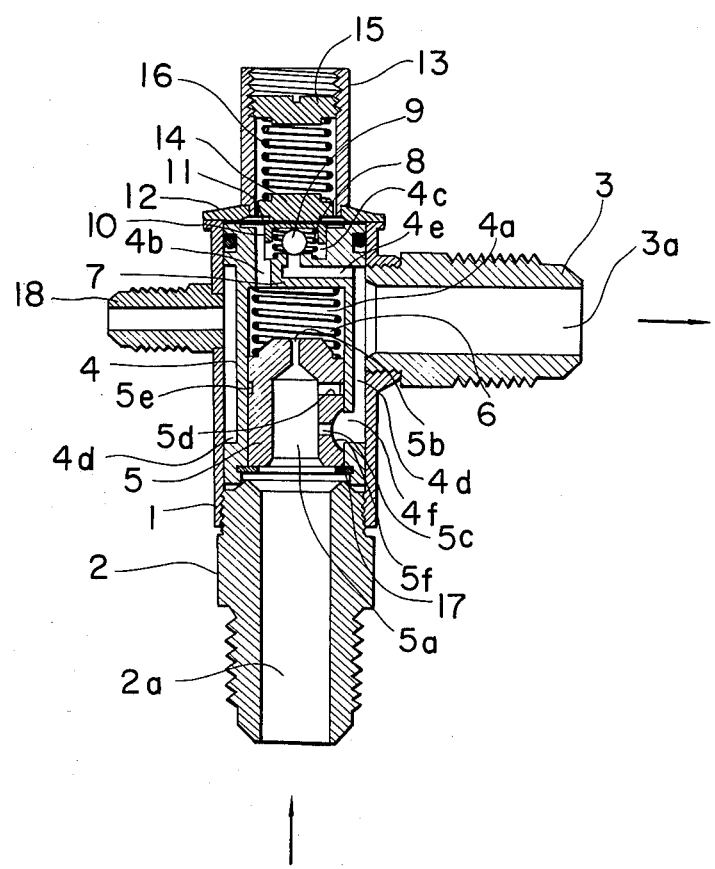

PILOT VALVE-TYPE EVAPORATING PRESSURE-REGULATING VALVE USED IN REFRIGERATORS

The present invention relates to a pilot valve-type evaporating pressure-regulating valve adapted to be provided in a low pressure system between an evaporator and a refrigerant compressor of a refrigerator, for maintaining the pressure of the refrigerant within the evaporator constant, the refrigerator consisting, as known per se, of the refrigerant compressor, a condenser, an external equalizing type expansion valve, and the evaporator.

Pilot-type evaporating pressure-regulating valves have been well-known. However, since the conventional evaporating pressure-regulating valves of this type rely upon bellows to detect the pilot pressure variation, and since the bellows are inserted deeply into the valve assembly, the adjustment of the spring acting on the bellows can hardly be made from the outside of the valve assembly.

In addition, the internal pressure or the internal vacuum of the bellows inconveniently changes, as a result of aging, i.e., as time elapses, the set value for the evaporation pressure is caused to change.

Therefore, the present invention aims at overcoming the above-described shortcoming of the prior art by providing an improved pilot-type evaporation pressure-regulating valve which is more sensitive to the pressure variation and which exhibits a high responsiveness, characterized by incorporating a diaphragm as a pressure responsive member to actuate a pilot valve, thereby ensuring enhanced operation of the regulating valve.

It is another object of the invention to provide a pilot-type evaporation pressure-regulating valve having a diaphragm provided at one end of a sleeve or a valve-housing to facilitate the adjustment of the operation pressure from the outside of the valve assembly, suitable for mass-production due to the fact that the ambient atmospheric pressure is utilized as a reference pressure for adjusting the operating pressure.

It is still another object of the invention to provide a pilot-type evaporation pressure-regulating valve having a bleeding port adapted to allow a part of the refrigerant to by-pass the valve when the latter closes a passage of the refrigerant, the bleeding port on the one hand avoiding hunting of the cycle at the time the valve begins opening by absorbing a small fluctuation of the pressure variation, and, on the other hand, providing suitable means for circulating a lubricating oil to the compressor during the closing of the pressure regulating valve.

It is a further object of the invention to provide a pilot-type evaporation pressure-regulating valve wherein the peripheral part of the bleeding port is suitably notched to reduce the mass of the piston valve at its one side to cause Coulomb's friction, thereby preventing the valve from vibrating.

The invention will be more fully understood from the following description of a preferred embodiment read in conjunction with the attached drawing which specifically shows a vertical section of a pilot-type evaporation pressure-regulating valve in accordance with the present invention.

Referring to the drawing, an outer sleeve 1 has at its one axial end a connecting pipe of a primary side 2 adapted to be screwed onto an outlet pipe for the refrigerant from an evaporator, and, at its peripheral portion, a connecting pipe 3 of a secondary side adapted to be screwed to a suction pipe of a compressor. The outer sleeve 1 houses and is fixedly provided with an inner sleeve 4 which has an axial end with an enlarged diameter to contact the inner surface of the outer sleeve 1 and is recessed at its middle portion to define an annular outer chamber 4d between itself and the inner surface of the outer sleeve 1.

The inner sleeve 4 provides on its inside portion an inner chamber 4a and has a side bore 4f provided at its lower portion to connect the inner and outer chambers to each other. The inner sleeve 4 houses a slidably moving piston valve 5 in the inner chamber 4a.

A spring 6 is located in the inner chamber between the piston valve 5 at its upper surface and the under surface of an end wall 7 provided at the upper end of inner sleeve 4.

The piston valve 5 is provided with an internal bore 5a having an opening at the lower end; at an upper end wall it is provided with an equalizer hole 5b with a small diameter, which connects the internal bore of piston valve 5 and the inner chamber 4a of inner sleeve 4. A bleeding port 5c is provided in the side wall of the piston valve 5 at the lower portion to connect the internal bore 5a and the outer chamber 4d. A passage port 5d is provided in the side wall of the piston valve 5 and connects with an annular groove 5e formed around the outer periphery of the piston valve 5. The outer peripheral portion of the bleeding port 5c is suitably notched, as designated at 5f, to reduce the mass of the piston valve.

The piston valve 5 is held at its lower end by a washer 17 secured in the inner sleeve 4, while the sleeve 4 is in turn held by the upper face of connector tubing 2 screwed into the outer sleeve 1.

The piston valve 5 is biased to a closed position, as illustrated in the drawing, by action of the compression spring 16 acting on the upper surface of the piston valve as hereinbefore set forth. The valve can assume an open position wherein the piston is moved upwardly against the action of spring 16 wherein the piston valve 5 is positioned above the side bore 4f.

The end wall 7 of the inner sleeve 4 is provided with a recess for a pilot chamber 4c, and a pilot passage 4e is adapted to connect the pilot chamber 4c with the outer chamber 4d.

A pilot valve 9 is positioned for opening and closing the pilot passage 4e and includes a ball valve which is fixedly secured by spot welding to a retaining metal plate 10 on the under surface. A pilot spring 8 is disposed between the bottom surface of pilot chamber 4c in the end wall 7 and the lower surface of retaining plate 10.

The pilot chamber 4c is closed by a diaphragm 11 which is clamped between the upper end faces of the inner sleeve 4. An upper cover 12 fixed to the outer sleeve 1 is kept in contact with the retaining plate. To the upper cover 12 having an opening is connected a spring box or sleeve 13 which houses a spiral metal spring 16 whose pressure is adjustable from the outside by rotation of a screw 15 secured to the interior of spring box 13.

The adjusting spring 13 is adapted to exert a downward force, along with an ambient atmospheric pressure to the diaphragm 11, and to oppose an upward biasing force exerted on the diaphragm 11 by the pressure in the chamber 4c and the pilot spring 8.

The outer chamber 4d on the one hand connects with the connecting pipe 3, while on the other hand, it connects with an external equalizing pipe (not shown), which is in turn connected to the lower side of a diaphragm of an expansion valve of the refrigerator cycle by a connecting pipe 18.

The internal bore 5a of the piston valve 5 connects with an evaporator of the refrigerator cycle by the connecting pipe 2, as aforementioned.

The above-described arrangement provides a relationship given by the following equation 1.

$$PcA = PoA + (S_2 - S_1) \quad (1)$$

where,

Pc: pressure in the pilot valve chamber 4c
$S_1$: compression force of the pilot spring 8
A: effective area of the diaphragm 11
$S_2$: compression force of the adjusting valve 16
Po: ambient atmospheric pressure (It is assumed here, then, that a relationship represented by $Pc \times A + S_1 = Po \times A + S_2$ exists)

Supposing that the pressure Pc is adjusted to be $Pc = 1.8$ Kg/cm$^2$G, a force corresponding to PcA can be obtained by adjusting the pressing force of spring 16 through the rotation of adjusting screw 16, while $S_1$ and Po are kept constant.

Since the pressure of all portions within the inner sleeve 4 is constant during the operation of the refrigerating cycle, the pressure differential $P_2a-P_4a$ across the piston valve 5 is kept constant, so that the piston valve 5 is lowered to its closing position by the force of the piston spring 6.

(1) In this state, when the pressure $P_4a$ applied to the lower side of the diaphragm exceeds the set pressure Pc, the valve 9 opens the passage 4e, so that the passage, bores, and chambers 4a, 4b, 4c, 4e, and 4d are connected with the suction pipe of the compressor.

(2) Therefore, as the compressor is started, the pressure in that passage and those bores and chambers are reduced as a result of sucking by the compressor.

By arranging so that the sucking amount sucked by the compressor through the passage 4e exceeds the supplying amount supplied through the inner chamber 4a, the pressure differential across the piston valve, i.e., the differential $P_E-P_4a$ between the pressure in the evaporator and the pressure in the inner chamber 4a, grows larger than the biasing force exerted by the piston spring 6, so as to move the piston valve toward its opening position. In this way, the fluid is sucked through the side bore 4f by the compressor to reduce the pressure $P_E$ in the evaporator.

(3) Then, as the pressure in the inner chamber 4a or in the pilot valve chamber 4c comes down lower than the set pressure Pc, the valve 9 comes to close the passage 4e.

(4) Consequently, the fluid in the chamber 4a is no longer sucked so as to lower the pressure differential across the piston valve. As the pressure differential becomes lower than the pressure provided by the spring 6, the piston valve 5 is moved to its closing position.

(5) As the compressor is started, the fluid in the outer chamber 4d is sucked to abruptly reduce the pressure in the chamber 4d, which acts to open the expansion valve 18 (not shown) connected to the external equalizing pipe 18 so as to compensate for the reduction of the pressure within the evaporator.

If the pressure acting on the lower side of the diaphragm is lower than the set pressure Pc, the reverse process of (3) to (5) will be taken.

Namely, as the pressure $P_4a$ applied to the upper side of the piston valve 5 becomes lower than the set pressure Pc, due to the reduction of the evaporating pressure $P_E$, the pilot valve 9 closes the passage 4e thereby compensating for the pressure reduction in the evaporator. On the other hand, when the pressure in the evaporator becomes higher then the set pressure, above processes (1) and (2) will be taken to reduce the evaporating pressure to the set value.

The bleeding port 5c is provided for reducing the load on the compressor and to return the lubricating oil to the compressor, when the piston valve 5 is fully closed. In addition, the bleeding port 5c effectively absorbs a small fluctuation of adjustment operation when the piston valve begins its function, thereby preventing the refrigerator cycle from hunting.

The passage port 5d is intended to transmit the evaporation pressure Ps to the annular groove 5e in the peripheral surface of the piston valve 5, thereby smoothening the operation of the piston valve.

The notch 5f around the bleeding port 5c is for reducing the mass of the piston valve 5 at one side thereof so as to cause Coulomb's friction between the piston valve 5 and the inner sleeve 4, thereby preventing the vibration of the piston valve 5 when it is operated.

What is claimed is:

1. A pilot-type evaporating pressure-regulating valve adapted to be disposed in a low pressure system between an evaporator and a compressor of a refrigerator cycle comprising:

a valve sleeve having an outer and an inner wall, said inner wall separating an inner chamber from an annular outer chamber, a primary connecting pipe in communication with said evaporator, provided at one axial end of said valve sleeve, a partition wall provided at the other end of said valve sleeve, defining a pilot chamber, a diaphragm confronting said pilot chamber, a spring of variable force acting on said diaphragm to maintain a set pressure and a mechanism for adjusting said set pressure, a secondary connecting pipe provided in the outer wall of said regulating valve to connect said outer chamber with said compressor and a junction for an equalizing pipe, said connecting pipe also formed in said outer wall of said regulating valve, a piston valve housed by said valve sleeve for opening and closing a passage for the refrigerant between said primary junction and said outer chamber, a pilot passage formed in said end wall to connect said pilot chamber with said inner and outer chambers, a pilot valve adapted to open and close said pilot passage being actuated and controlled by said diaphragm, an equalizer hole formed in said piston valve allowing a flow rate of said refrigerant smaller than that provided by said pilot passage when the latter is opened, in order to equalize the pressures within said inner chamber across itself when said pilot passage is closed by said pilot valve, and a spring acting on said piston valve adapted to move said piston valve to its closing position to close said passage for refrigerant when said pressures across said equalizer are equalized in said inner chamber in the state of closing of said pilot valve, said pressures across said equalizer within said inner chamber causing a differential, when said pilot valve is closed, to move said piston valve for opening said passage for said refrigerant.

2. A pilot-type evaporation pressure-regulating valve as claimed in claim 1, wherein a bleeding port in communication with said outer chamber is formed in said piston valve to allow a part of the refrigerant to get into said outer chamber when said passage for said refrigerant is closed.

3. A pilot-type evaporation pressure-regulating valve as claimed in claim 2, wherein a notched part is provided to surround said bleeding port.

* * * * *